April 26, 1932.   A. A. SORENSON   1,855,425
WATER WHEEL FOR GENERATING ELECTRIC CURRENT
Filed Sept. 16, 1927   2 Sheets-Sheet 1

Inventor
Axel A. Sorenson
By [signature]
Attorney

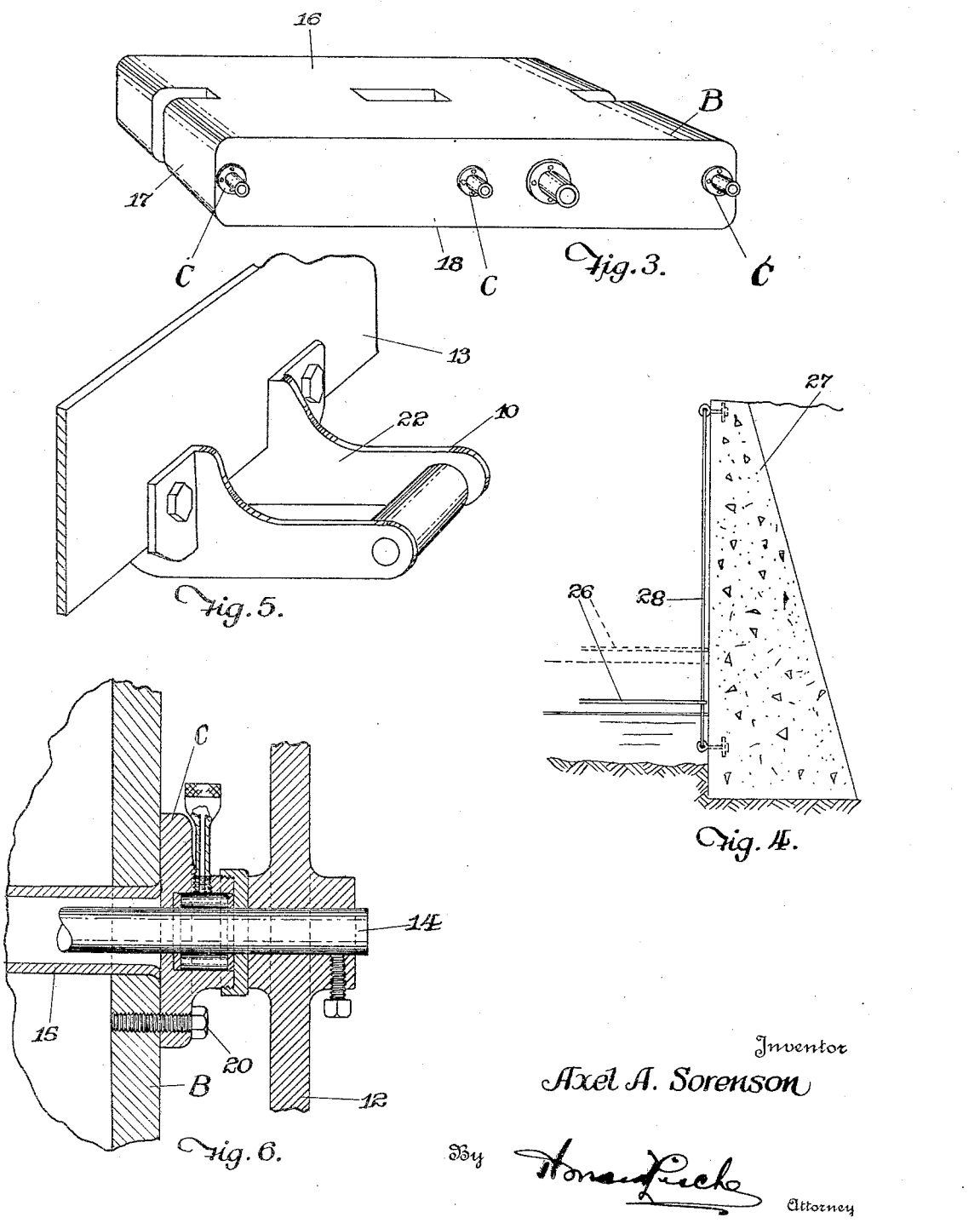

Patented Apr. 26, 1932

1,855,425

UNITED STATES PATENT OFFICE

AXEL A. SORENSON, OF KENNEDY, MINNESOTA

WATER WHEEL FOR GENERATING ELECTRIC CURRENT

Application filed September 16, 1927. Serial No. 219,876.

My invention relates to water wheels for generating electric current and is adapted to provide a means of operating the electrical generator in a very economical manner.

The invention includes a peculiar arrangement of parts which provide a buoyant element adapted to be floated in the water and means for holding the buoyant element in the water so that the water will operate the members carried by the buoyant element to operate the electric generators to make electric current.

The buoyant element forms the body for holding the mechanism in a floating position virtually on top of the water in a stream or where the water is moving so as to operate the mechanism for rotating the generators.

It is also a feature of my invention to provide means for supporting the water wheel for generating electric current in a manner to compensate for the rise and fall of water to permit the generator to raise and lower by the action of the level of the water.

These features together with other details and objects of the invention will be more specifically and clearly set forth in the specification and claims.

In the drawings forming part of this specification:

Figure 3 is a perspective view of the buoyant element with the other parts removed.

Figure 4 is a detail sectional view of a portion of my device.

Figure 5 is an enlarged perspective of a portion of my device.

Figure 6 is a sectional detail of one of the roller bearings for the wheels carrying the operating paddles.

Figure 1:
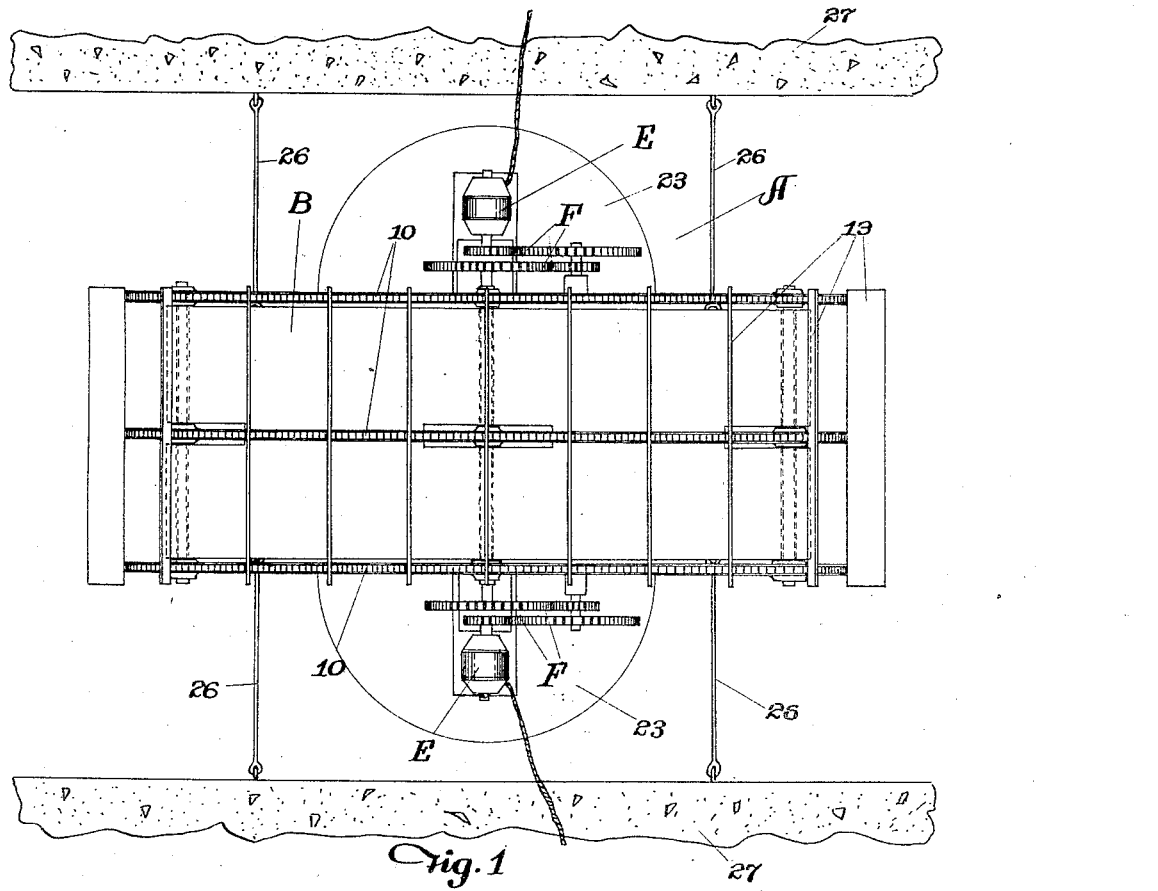
Figure 1 is a plan view diagrammatically illustrating the water wheel for generating electric current positioned in a stream of water.
Figure 2:
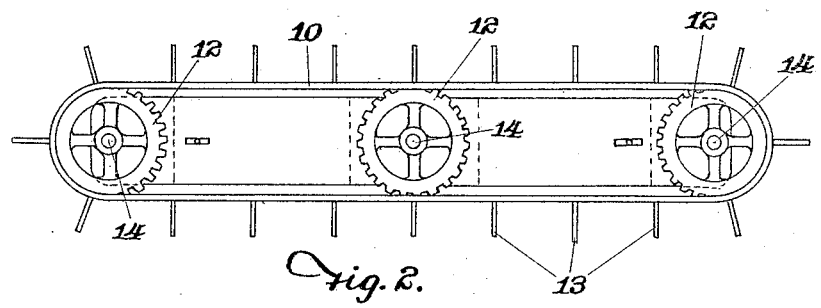
Figure 2 is a detail side view of a portion of the same.

In the drawings my electric generator A is illustrated in the plan view as it would appear positioned in a stream of water. The buoyant element B forms the main body of the device and is adapted to carry the operating chains 10 which rotate over the sprocket wheels 12 in a manner to permit the paddle members 13 to be readily engaged by the water.

The sprocket wheels 12 are carried on the operating shafts 14 and these shafts are adapted to extend through the buoyant element B which is provided with a tubular opening 15 through which the shaft 14 extends from one side to the other of the buoyant element B.

The buoyant element B is in the form of a tank having a top 16, ends 17, and a bottom 18. This buoyant element can be of a rectangular shape or any other suitable formation, and the tubular openings 15 extend through the same leaving the buoyant element airtight, thus permitting the shafts 14 to extend through the same.

I provide roller-bearings C which are held by the bolts 20 to the sides of the buoyant element B and these bearings C are adapted to support the shafts 14. The shafts 14 support the sprocket wheels 12 and the sprocket wheels carry the chains 10. The roller bearings C can be of any suitable construction and are adapted to permit the shafts 14 to rotate very freely and easily so that the least movement of the water will cause the paddles 13 to be carried in the direction of the flow or movement of the water to rotate the wheels of the generating device A.

The enlarged detail in Figure 5 illustrates a portion of one of the paddle members 13, showing the clamping and supporting member 22 for the paddle which is a part of one of the links of the chains 10. In this manner the paddle members 13 are supported by the three longitudinally extending chains 10 which extend on either side and over the center of the buoyant element B.

The generator A is provided with one or more electric generators E of any ordinary well known type which are supported on suitable platforms 23 attached or forming a part of the buoyant member B. The generators E are connected by a series of gears F in a manner so as to gear up the generators E in relation to the driving chains 10 and gears 12. Thus when the paddles 13 are moved in a manner to operate the driving chains 10 the chain of gears F cause the electric generators E to be rotated at a speed sufficient to generate electric current. The chain of gears F are of ordinary construction and are mounted in roller or ball bearings, not illustrated in the drawings, so that they will rotate very freely and the generators E may be also ball bearing mounted to permit the entire mechanism to be rotated with as little friction as possible.

The generator A is supported in the water preferably in a stream or river where the water is moving fairly rapidly beneath the generator. This causes the operation of the paddles 13 to generate current from the dynamo E. I provide means for supporting the generator A in the stream which includes the cables 26 which extend to the wall 27 and which are connected to the perpendicular rod 28 in a manner to permit the entire generator to raise and lower according to the height of the water. This is accomplished by the cables 26 slidably engaging the rods 28. The walls 27 can be of concrete or any other suitable material anchored in the stream. Obviously, the walls may be substituted by piles which can be driven into the stream in a manner to form anchors for holding the ends of the cables which hold the generator positioned in place in the stream.

The simple construction illustrated provides a means for generating electric current at a low cost and the current from the generators E may be directed to storage batteries or it may be used direct, as may be desired. The cost of maintaining the generator A is very low and the real cost of the electric current made by the generator is mainly in the first cost of the equipment and to install the same.

In accordance with the patent statutes I have described the principles of operation of my water wheel for generating electric current and while I have illustrated a particular formation and construction of the parts in the drawings, I desire to have it understood that the same are only suggestive of a means of carrying out my invention and that various changes may be made within the scope of the following claims without departing from the spirit of the invention.

I claim:

1. In a device of the class described, a member adapted to be buoyantly and adjustably supported to the level of the water within a stream to hold the same stationary, wide paddle members extending transversely across said member, a series of endless chains having links therein adapted to carry and support said paddle members extending over the entire upper and lower surfaces of the buoyant member, and a series of vertically centrally disposed sprockets some of which extend through said buoyant member adapted to carry said endless chains.

2. A water wheel comprising a buoyant member, paddle members extending about and across said buoyant member, shafts extending through said buoyant member, and sprockets carried by said shaft outside said buoyant member adapted to support said paddle members.

3. A current motor comprising a buoyant tank-like member, shafts extending through said member, sprockets positioned on the ends of said shafts and intermediate with the ends thereof, operating chains carried by said sprockets, paddle members carried by said chains to extend across and adapted to project on either side of said buoyant member to provide wide paddle means on said chains, and means for holding said buoyant member stationary in a stream of water in relation to the flow of the water.

AXEL A. SORENSON.